United States Patent
Davidge et al.

[11] Patent Number: 5,220,815
[45] Date of Patent: Jun. 22, 1993

[54] DEVICE-PORT LOCKING COVERS

[75] Inventors: Ronald V. Davidge, Coral Springs; John R. Dewitt, Boca Raton; Paul J. Galinis, Boynton Beach; Francis A. Kuchar, Jr., Delray Beach; Jay H. Neer; Thomas H. Newsom, both of Boca Raton, all of Fla.

[73] Assignee: International Business Machines Corporation, Armonk, N.Y.

[21] Appl. No.: 3,942

[22] Filed: Jan. 19, 1993

Related U.S. Application Data

[63] Continuation of Ser. No. 762,138, Sep. 19, 1991, abandoned.

[51] Int. Cl.$^5$ .................. E05B 73/00; H01R 13/44
[52] U.S. Cl. ........................... 70/14; 70/57; 70/168; 70/DIG. 57; 439/133
[58] Field of Search ............ 70/14, 57, 58, 167-169, 70/232, DIG. 57; 439/133, 134

[56] References Cited

U.S. PATENT DOCUMENTS

| | | | |
|---|---|---|---|
| 2,880,903 | 4/1959 | Nehls | 70/169 X |
| 2,987,909 | 6/1961 | Shlank | 439/133 X |
| 3,129,992 | 4/1964 | Blonder | 439/133 |
| 4,527,405 | 7/1985 | Renick et al. | 70/14 |
| 4,584,856 | 4/1986 | Petersdorff et al. | 70/168 X |
| 4,655,057 | 4/1987 | Derman | 70/14 |
| 4,669,281 | 6/1987 | Young | 70/57 |
| 4,685,312 | 8/1987 | Lakoski et al. | 70/14 |
| 4,741,185 | 5/1988 | Weinert et al. | 70/57 |
| 4,794,587 | 12/1988 | Cordiano | 369/292 |
| 4,898,009 | 2/1990 | Lakoski et al. | 70/58 |
| 4,904,202 | 2/1990 | Uchida | 439/372 |
| 4,907,111 | 3/1990 | Derman | 360/97.02 |
| 4,918,952 | 4/1990 | Lakoski et al. | 70/57 |
| 4,922,734 | 5/1990 | Iannucci | 70/58 |
| 4,924,683 | 5/1990 | Derman | 70/14 |
| 4,932,874 | 6/1990 | Hollopeter et al. | 439/133 |
| 4,964,286 | 10/1990 | Poyer | 70/58 |

FOREIGN PATENT DOCUMENTS

| | | | |
|---|---|---|---|
| 585750 | 10/1933 | Fed. Rep. of Germany | 439/133 |
| 2218727 | 11/1989 | United Kingdom | 70/57 |

*Primary Examiner*—Lloyd A. Gall
*Attorney, Agent, or Firm*—Ronald V. Davidge; Richard A. Tomlin

[57] ABSTRACT

Lockable covers are used to cover either of two types of shield blocks to prevent access to circuits within either of two types of external ports on computing devices. Each such shield block covers the port contacts associated with these circuits, includes locking surfaces for holding the lockable cover in place, and is itself held in place by the attachment features provided on the external port for holding an external cable in place. One such shield block is held in place by a pair of screws extending into threaded holes in the external port, while the other such shield block is held in place by a pair of flexible wire bails rotatably mounted in the external port.

9 Claims, 3 Drawing Sheets

DEVICE-PORT LOCKING COVERS

CROSS-REFERENCE TO A RELATED APPLICATION

This application is a continuation of a prior application, Ser. No. 762,138, filed Sep. 19, 1991, now abandoned.

BACKGROUND OF THE INVENTION

This invention relates to devices to prevent unauthorized access to data within computer systems, and, more particularly, to data security devices lockably attached over unused external connector ports.

DESCRIPTION OF THE RELATED ART

U.S. Pat. No. 4,669,281, "Cable/Computer Peripheral Lock", to Young, describes apparatus for locking the cabling system of a computer, wherein a structure is held in place, by screws, on a connector port extending from a cable connector, and a slidable cover is locked into place over this structure, blocking access to these screws to prevent the removal of the structure from the cable terminal. Thus, while the structure disclosed in the Young reference has provisions for locking onto an external port having threaded holes for holding an external cable in place, the alternative of locking onto an external port having rotatable bails for this purpose is not addressed. Furthermore, the Young reference does not teach the application of apparatus directly to a device port, the cable connector as disclosed therein has a contact structure, or terminal, on each of two parallel, opposite faces, on a "cabling system having a first terminal to be protected." While the Young reference discloses installation of a lockable cover by sliding its grooved surfaces over edges of the structure in a direction parallel to the face of the contact terminal, the present invention teaches the installation of the lockable cover in a direction perpendicular to the face of the contact terminal. This difference is particularly important if the locking apparatus is to be applied directly to a device port, since such a port is often located in a depression in the device cover structure, so that this structure may interfere with movement of the locking cover in a direction parallel to the face of the contact terminal. As disclosed in the Young reference, the length of the track between the lockable cover, and the lockable cover and the structure, provides stability to the assembly of these parts, while in the present concept stability is provided by a cantilever spring operating between the lockable cover and the shield block.

Our application, Ser. No. 762,142, now U.S. Pat. No. 5,169,332 filed concurrently herewith and assigned to the same assignee, entitled "Means For Locking Cables And Connector Ports" describes modifications to devices to allow the locking of the shield blocks to the devices by means of the locking mechanisms holding the device covers in place. The concept described herein can be used as, e.g. an optional upgrade, i.e., the locking covers of the present invention can be installed by someone having a system built without this feature, without modification to the system.

Our application, Ser. No. 762,141, now U.S. Pat. No. 5,190,455 filed concurrently herewith and assigned to the same assignee entitled "Cable Locking Covers" describes the use of individually locked covers to hold cables and terminators in place. In the apparatus described in that application, a terminator can be replaced by a shield block. The locking covers described in that disclosure are built primarily for use in locking external cables in place; they therefore have holes, through which cable wires may pass, which must be plugged during other applications. The concept described therein when applied to an external device port not requiring either a cable or a terminator requires the use of both a shield block and a bracket within the locking cover. The present application concept requires only the use of a shield block. The locking covers in the invention as described in that application "Cable Locking Covers" is designed for use with either a cable port having threaded holes for holding an attached cable in place, or a cable port having rotatable flexible bails for this purpose. In the present invention, the locking cover can be used with either type of cable port.

The present invention is intended in particular, for use on computer systems with cabled peripheral devices using the SCSI interface (Small Computer System Interface). The use of this interface presents special data security problems, since it is possible to activate file devices from remote units. In general, systems and peripheral devices using the SCSI interface have external connector ports for the attachment of external cables to other devices. Even when such a port is not used, i.e., when it has no attached cable, it constitutes a data security hazard, since the port could be accessed and data obtained through an unauthorized attachment of a remote unit.

The particular circuits used with some SCSI interface applications require the use of a terminator on such an unused external port. A terminator of this kind is a connector having various contacts adapted for engagement with various of the contacts within the external port and interconnected using electrical elements, such as resistors. When a terminator is required on an unused external port, data security can be achieved using the invention described in the copending application entitled "Cable Locking Covers."

However, other particular circuits used with SCSI interface applications do not require the use of a terminator on such an unused external port. With such applications, data security can be achieved using the invention described in the present application.

SUMMARY OF THE INVENTION

A single type of lockable cover is used to cover either of two types of shield blocks to prevent access to circuits within either of two types of external ports on computing devices. Each such shield block covers the port contacts associated with these circuits, includes locking surfaces for holding the lockable cover in place, and is itself held in place by the means provided on the external port for holding an external cable in place. One such shield block is held in place by a pair of screws extending into threaded holes in the external port, while the other such shield block is held in place by a pair of flexible wire bails rotatably mounted in the external port.

A typical SCSI interface adapter card, which may be used in a computer system, includes an internal card edge connection with the interface and an external SCSI-II connector, which may be a small D-shell type of port having threaded holes to be used for the attachment of a cable. It is likely that such an adapter card may be used in an application having internal devices, such as disk drives, using the SCSI interface without having external devices attached to the external SCSI connector. In such an application, an external device could be used surreptitiously to obtain data from the internal drives. The present invention provides a means for locking a shield in place over a connector port of the small D-shell type having threaded holes for the attachment of an external cable.

A typical SCSI peripheral device includes two external SCSI-I connectors, each of which is a relatively large D-shell types of port having a flexible bail rotatably mounted at each end thereof for the attachment of a cable. While one such port is typically connected to the system unit, the other port may be connected to an additional peripheral device. If no such additional peripheral device is attached, the unused external port can be used to obtain data from both the peripheral device and from drives within the system unit. The present invention provides a means for locking a shield in place over a connector port of the relatively large D-shell type having rotatably mounted bails for the attachment of an external cable.

The present invention uses a number of common parts to provide data security with locking devices on different types of port connectors. While one type of port connector provides a pair of threaded holes for the attachment of a cable connector by means of a pair of screws, another type of port connector provides a pair of rotatable bails, with which a cable connector can be latched in place. Security devices for these different types of port connectors use common lock mechanisms and associated parts, such as springs and locking tabs. If an appropriate relationship exists between the sizes of the different types of port connectors, the same covers may be used as well, and it is possible to construct a shield block with provisions for use on both types of port connectors.

DESCRIPTION OF THE PREFERRED EMBODIMENTS

In the various figures similar parts are given similar designations.

Figure 1:
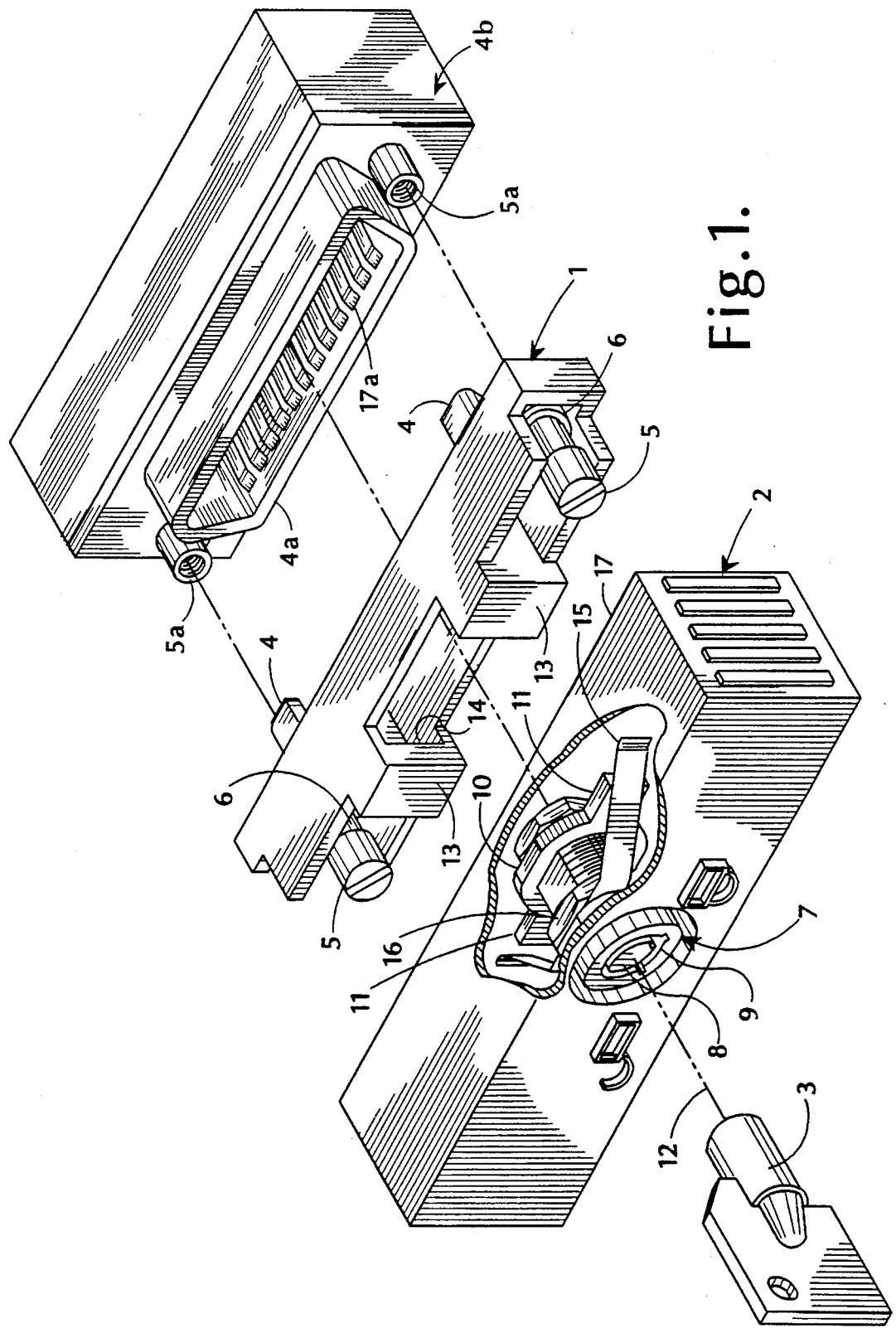
FIG. 1 is a partially exploded view of a configuration of the invention which is adapted for use on a connector port having threaded holes for the attachment of a cable.

Referring now to FIG. 1, a configuration of the invention, adapted for use with an external device-port having threaded holes for holding an attached cable connector in place, consists of a shield block, generally designated 1, a lockable cover, generally designated, 2, and an encoded key 3. Shield block 1 includes an integral shroud 4, which is configured to engage the mating shroud 4a of a device port connector, generally designated, 4b, and a pair of screws 5 which are spaced and configured to engage threaded holes 5a in the device port connector 4b. These screws 5 pass through screw-mounting bosses 6, and are preferably assembled on these bosses in a captive manner; i.e., retaining clips (not shown) are installed on these screws on the sides of these screws opposite to the screw heads, so that axial movement of the screws relative to the bosses is prevented while rotation of the screws is not restrained. Lockable cover 2 includes a rotary locking mechanism, generally designated 7, which is configured in a method well known in the art so that an internal cylinder 8 is free to turn through a fixed angle when encoded key 3 is inserted in slot 9, but so that this type of rotation is prevented when the key is not inserted in this slot. Locking plate 10, with a pair of locking tabs 11 on opposite sides of the axis 12 of internal cylinder 8 is assembled to the internal cylinder so that it turns therewith, establishing a locked position when internal cylinder 8 and locking plate 10 are oriented as shown and an unlocked position when these parts are rotated ninety degrees from this orientation. Shield block 1 includes a pair of integral bars 13 with locking surfaces 14 oriented so that, when lockable cover 2 is assembled on the shield block 1, the rotation of locking plate 10 into its locked position rotates locking tabs 11 into position inwardly adjacent to locking surfaces 14, thereby preventing the subsequent disassembly of lockable cover 2 from shield block 1 until locking plate 10 is rotated back into its unlocked position. It should be noted that the assembly of lockable cover 2 inwardly onto shield block 1 can only occur when locking plate 10 is in its unlocked position. Lockable cover 2 also includes a cantilever spring 15, clamped in place over an inward extending portion of rotary locking mechanism 7 by means of nut 16 to press inward upon adjacent surfaces of shield block 1 when the shield block and lockable cover are assembled together, holding locking tabs 11 outwardly against adjacent locking surfaces 14 and thereby providing stability to the assembly. The assembly of this locking mechanism is begun by plugging integral shroud 4 of shield block 1 onto the mating surface of the device-port (not shown) and by tightening screws 5 in the corresponding threaded holes (not shown) of the device port. Lockable cover 2 is then placed over shield block 1, with internal lock cylinder 8 and locking plate 10 in their unlocked position. Encoded key 3 is then used to turn cylinder 8 and locking plate 10 into their locked position, and this key 3 is then removed to be stored in a safe place. At this point lockable cover 2 cannot be removed from shield block 1 because locking tabs 11 extend adjacent to locking surfaces 14 of the shield block. Also, screws 5 cannot be loosened because housing 17 of lockable cover 2 blocks access so data security is maintained as physical access to contact terminals 17a within connector 4b is blocked.

The disassembly of this locking mechanism is begun by turning internal cylinder 8 and locking plate 10 to their unlocked position, using encoded key 3. This rotation releases locking tabs 11 from locking surfaces 14 so that lockable cover 2 can be removed from shield block 1. After these parts are separated, screws 5 are loosened and shield block 1 is removed outwardly from device port connector 4b.

Figure 2:
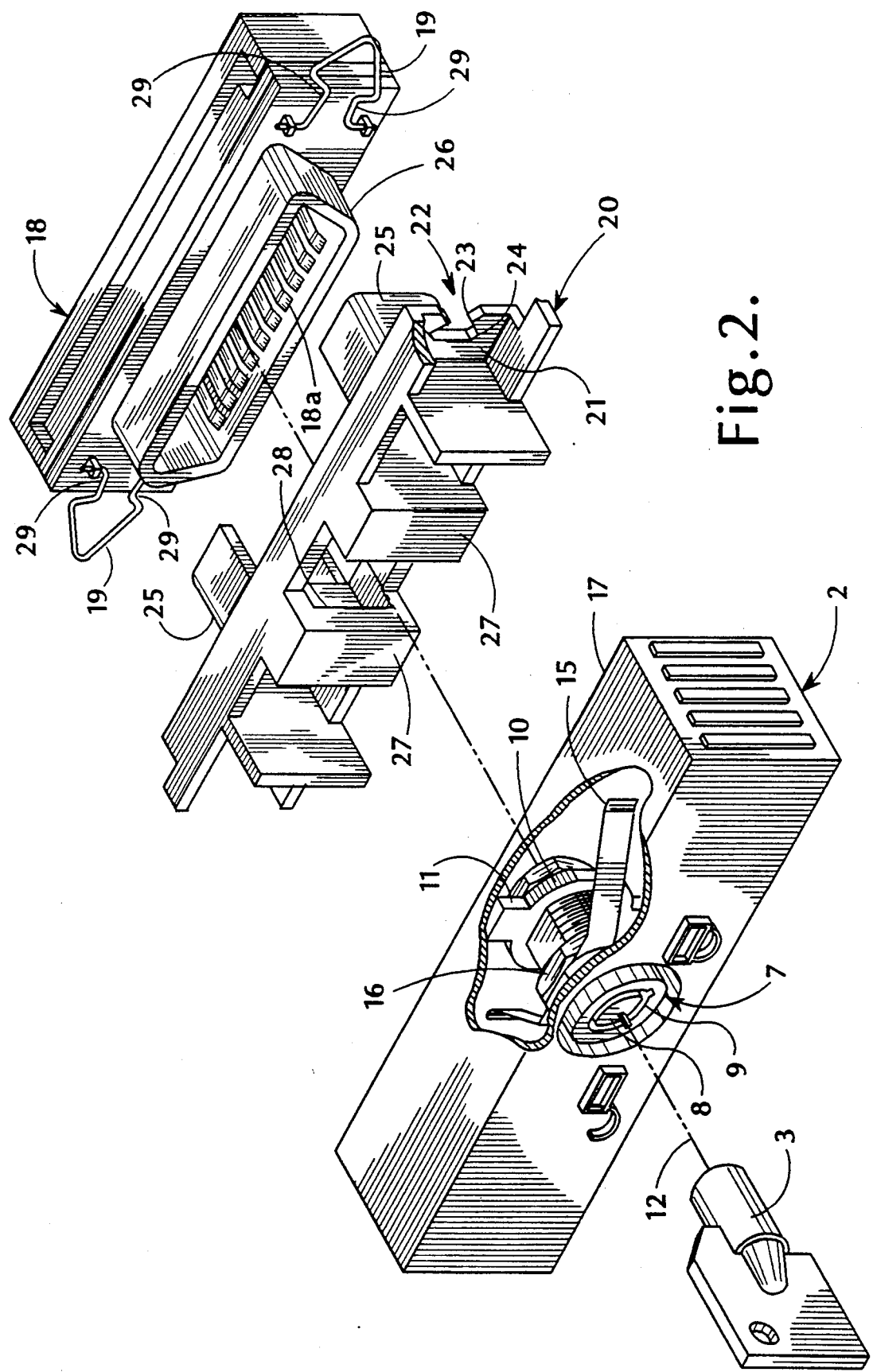
FIG. 2 is a partially exploded view of a configuration of the invention which is adapted for use on a connector port having rotatable bails for the attachment of a cable.

Referring now to FIG. 2, a configuration of the invention which is adapted for use on a connector port, generally designated, 18 having a plurality of internal contact terminals 18a and rotatable bails 19 for holding an attached cable connector, (not shown), in place, consists of a latchable shield block, generally designated, 20, a lockable cover 2, and an encoded key 3. Lockable cover 2 and encoded key 3 are constructed and used as described above in reference to FIG. 1; depending on the relative sizes and shapes of the connector ports, these devices may be used interchangeably with either shield block 1 of FIG. 1 or latchable shield block 20 of FIG. 2. Lock mechanism 7 is shown in its unlocked position, with locking tabs 11 being rotated 90 degrees from the locked position shown in FIG. 1. This latchable shield block 20 includes, at each end, a slotted tab 21 configured for the attachment of the latchable block to connector port 18 by means of rotatable bails 19. Each slotted tab 21 includes an attachment slot 22 extending past a narrowed section. 23 to a widened section 24. Latchable shield block 20 further includes flanges 25, which extend partially around the mating portion 26 of connector port 18 when the latchable shield block 20 is installed on the connector port 18, and a pair of integral bars 27 with locking surfaces 28 oriented so that, when lockable cover 2 is assembled on shield block 20, it may be held in place or released from shield block 20 by means of rotary locking mechanism 7 as previously described in reference to FIG. 1.

The assembly of this locking mechanism is begun by inserting latchable shield block 20 over connector port 18 and by rotating each of the rotatable bails 19 inward within its associated attachment slot 22, past narrowed section 23 into widened section 24, whereby each rotatable bail is first compressed, with the two sides 29 of bail 19 being pushed together, flexing the wire of bail 19, and then allowed to expand, with the two sides 29 of bail 19 being allowed to move apart, thus holding the latchable shield block 20 in place. Lockable cover 2 is then installed over latchable block 20 with rotary locking mechanism 7 in an unlocked position, so that locking tabs 11 clear integral bars 27. Then rotary locking mechanism 7 is rotated into a locked position so that locking tabs 11 are adjacent to locking surfaces 28, thereby preventing the removal of lockable cover 2 from latchable shield block 20. While lockable cover 2 is thus held in position, housing 17 of this cover surrounds the regions occupied by rotatable bails 19 extending through attachment slots 22, so that these bails cannot be pivoted outward to release latchable shield block 20.

This assembly process is essentially reversed to accomplish the removal of the locking mechanism. First, rotary locking mechanism 7 is rotated into an unlocked position using encoded key 3, and lockable cover 2 is removed from latchable block 20. Then rotatable bails 19 are rotated outward to release latchable shield block 20 so that it can be disengaged from connector port 18.

Figure 3:
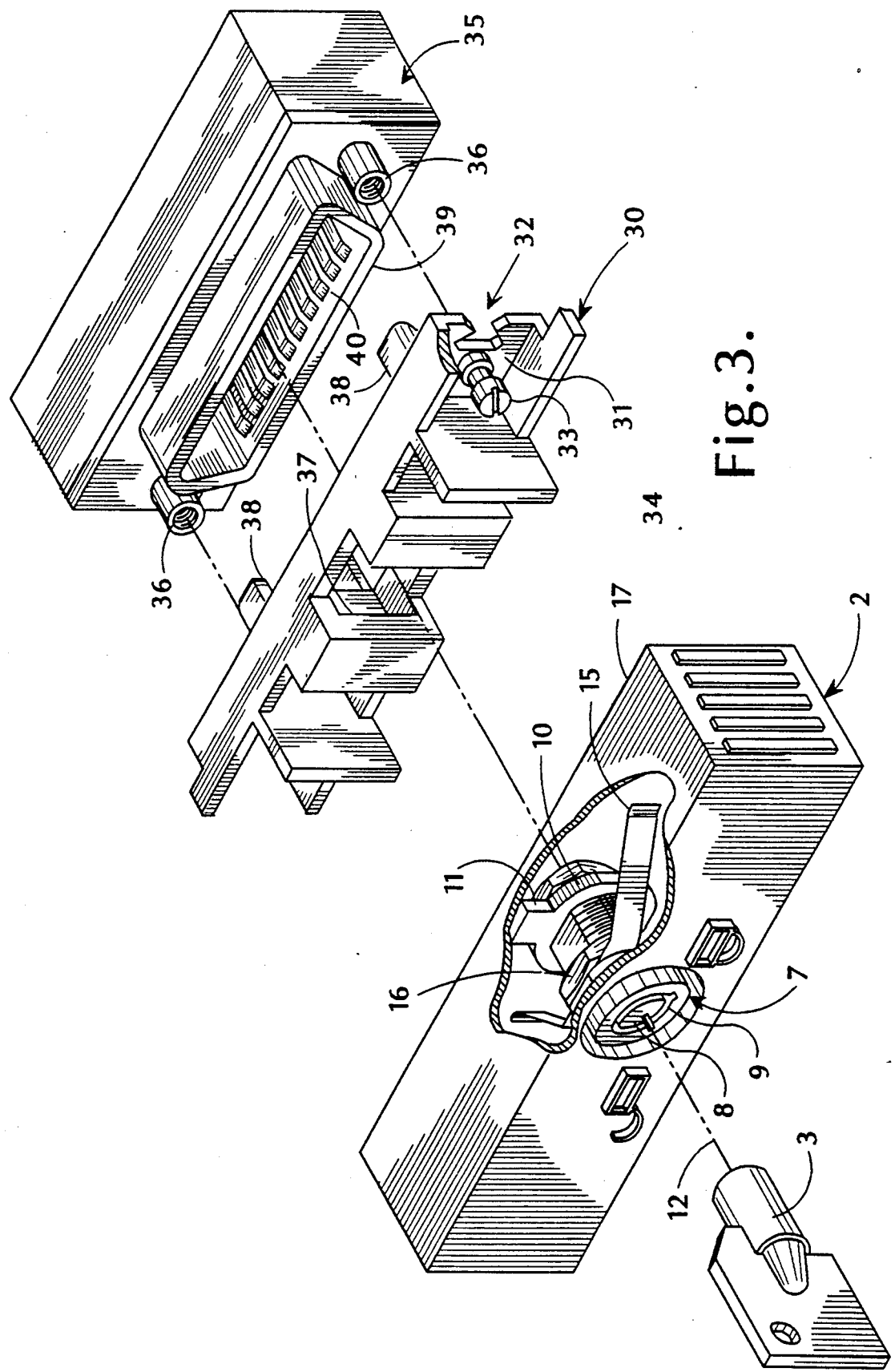
FIG. 3 is a partially exploded view of a configuration of the invention which is adapted for use on either a connector port having rotatable bails or threaded holes for the attachment of a cable.

Thus, depending on the relative sizes and shapes of the device-port connectors, a single type of lockable cover 2 is used to lock either of two types of external connectors, using either of two types of shield blocks. Depending furthermore on the relative sizes of these connectors, it may alternatively be possible to use a single shield block, generally designated, 30 with both slotted end tabs and captive attachment screws, as shown in FIG. 3, to lock either type of connector. Shield block 30 includes a pair of slotted tabs 31 with slots 32, which operate as fastening surfaces, in the manner described above with reference to FIG. 2, for attachment to a connector having rotatable bails, such as connector 18 (shown in FIG. 2). Shield block 30 also includes a pair of captive screws 33 for alternate attachment to a port connector, generally designated 35, having threaded holes 36 for cable attachment. Depending again on the relative sizes of the connectors involved, connector 35 may be similar or identical to port connector 4b of FIG. 1. Shield block 30 includes a pair of locking surfaces 37, which function as previously described locking surfaces 14 and 28 (shown in FIGS. 1 and 2, respectively) with lock mechanism 7 of cover 2. Shield block 30 also includes a pair of flanges 38, which extend partly around the mating portion 39 of connector port 35, or alternatively partly around portion 26 of connector 18 (shown in FIG. 2). Mating portion 39 includes a plurality of contact terminals 40, which are shielded from external access by the attachment of shield block 30 and locking cover 2.

What is claimed is:

1. Apparatus for blocking physical access to contacts in an external port of a device, wherein said external port includes engageable means for fastening a cable connector in attachment with said port, said cable connector being engaged with said port in an inward direction and disengaged with said port in an outward direction, and wherein said apparatus comprises:
   a cover including an outward-facing closed end with an aperture therein, sides extending inward, entirely around a periphery of said closed end, and an inward-facing open end, defined by edges of said sides, opposite said closed end;
   a lock mechanism mounted in said aperture, including an outward-facing face with a slot therein, a movable locking tab within said sides, and means actuable when a key is inserted within said slot for moving said locking tab in either direction between an unlocked position and a locked position;
   a key for actuating said lock mechanism; and
   a shield block configured for mounting on said external port, within said cover, surrounded by said closed end and said sides, including fastening means for engaging said engageable means, and a locking surface extending outwardly adjacent to said locking tab, when said shield block is mounted within said cover and when said locking tab is in said locked position;
   wherein said cover can be installed on said shield block in said inward direction when said locking tab is in said unlocked position; and
   wherein said cover can be removed from said shield block in said outward direction when said locking tab is in said unlocked position.

2. Apparatus as recited in claim 1, comprising in addition a spring extending inwardly from said closed end to contact said shield block when said shield block is mounted within said cover.

3. Apparatus as recited in claim 1, wherein said engageable means comprises a threaded hole; and wherein said fastening means comprises a screw rotatable within said threaded hole and within a hole in said shield block.

4. Apparatus as recited in claim 1, wherein said engageable means comprises a flexible bail rotatably mounted on said port;
   wherein said fastening means comprises a slotted tab extending from said shield block; and
   wherein rotation of said bail from an unlocked to a locked position, when said shield block is installed on said port, brings a portion of said bail into a position outwardly adjacent to a surface of said slotted tab.

5. Apparatus as recited in claim 2, wherein:
   said shield block includes a central aperture through which a portion of said lock mechanism extends inward when said cover is installed on said shield block, with locking surfaces extending on two opposite sides of said central aperture;

said lock mechanism includes a locking plate having a pair of locking tabs extending radially outward at diametrically opposed position, said locking plate being pivoted about an axis between said locked position, in which said tabs are inwardly adjacent to said locking surfaces, and said unlocked position, in which said tabs pass outward through said central aperture as said cover is removed from said shield block; and said spring extends radially to contact said shield bock at opposite sides of said lock mechanism.

6. Apparatus for blocking physical access to contacts in an external port of a device, wherein said external port includes a flexible bail rotatably mounted thereon, and wherein said apparatus comprises:

a shield block, configured for engagement with said external port by inward movement and for disengagement therewith by outward movement, including a locking surface and a slotted tab configured so that, when said shield block is engaged with said port, rotation of said bail from an unlatched to a latched position brings a portion of said bail into a position outwardly adjacent to a surface of said slotted tab; and a cover, configured for engagement with said shield block by movement in an inward direction and for disengagement therewith by movement in an outward direction, including a locking tab, locking means operable with an encoded key for moving said locking tab between a locked position, and an unlocked position, said locking means being positioned in an outward-facing closed end of said cover, said cover including walls extending from a periphery of said closed end inward to an open end opposite said closed end;

wherein, when said cover is engaged with said shield block, said cover prohibits external access of said flexible bail;

wherein said tab in said locked position is inwardly adjacent to said locking surface; and wherein said tab in said unlocked position is moved away from said locking surface.

7. Apparatus for prohibiting physical access to contacts in either of a first or second type of external port in a device, wherein said first and second types of external ports engage cable connectors moved inward thereto and release cable connectors moved outward therefrom, wherein said first type of external port includes a first means for fastening a first type of external cable in place on said port, wherein said second type of external port includes a second means for fastening a second type of external cable in place on said port, wherein said first and second means for fastening provide different fastening surfaces for fastening said first and second types of external cables and wherein said apparatus comprises:

a cover including an outward-facing closed end with key-operated locking means for moving a locking tab between a locked and an unlocked position, and a shroud extending inward around an entire periphery of said closed end to an open end opposite said closed end;

a first shield block engageable with said cover, within said shroud, including a lockable structure held in place by said locking tab in said locked position and released by said locking tab in said unlocked position, and first means for engaging said first means for fastening to hold said shield block in place on said first type of external port, wherein said cover engaged with said first shield block covers said first means for engaging;

a second shield block engageable with said cover, within said shroud, including a lockable structure held in place by said locking tab in said locked position and released by said locking tab in said unlocked position; and second means for engaging said second means for fastening, to hold said second shield block in place on said second type of external port, wherein said cover engaged with said second shield block covers said second means for engaging;

wherein said shroud fits over said first and second shield blocks to be attached thereto by inward movement and to be removed therefrom by outward movement.

8. Apparatus as recited in claim 7, wherein said first means for fastening comprises a threaded hole in said first type of external port, wherein said second means for fastening comprises a flexible bail rotatably mounted on said second type of external port, and wherein:

said first means for engaging comprises a screw rotatable within said threaded hole and within a hole in said first shield block; and said second means for engaging comprises a slotted tab configured to be held in engagement with said second type of port when said flexibel bail is rotated from an unlatched to a latched position, and released from engagement with said second type of port when said flexible bail is rotated from said latched to said unlatched position.

9. Apparatus for prohibiting physical access to contacts in either of a first or second type of external port in a device, wherein said first and second types of external ports engage cable connectors moved inward thereto and release cable connectors moved outward therefrom, wherein said first type of external port includes a threaded hole for fastening an external cable in place thereon, wherein said second type of external port includes a rotatable bail for fastening an external cable in place thereon, and wherein aid apparatus comprise:

a cover including an outward-facing closed end with key-operated locking means for moving a locking tab between a locked and an unlocked position, and a shroud extending inward around an entire periphery of said closed end to an open end opposite said closed end;

a shield block engageable with said cover as said cover is moved inward with said shroud being moved around said shield block, including a lockable structure held in place by said locking tab in said locked position and released by said locking tab in said unlocked position to allow outward motion of said cover on said shield block, a screw for engaging said threaded hole to hold said shield block in place on said first type of external port, and a slotted tab for engaging said rotatable bail for fastening said shield block in place on said second type of external port, wherein said cover engaged with said shield block blocks access to said screw and said rotatable bail.

* * * * *